June 29, 1954  P. ROBINSON ET AL  2,682,626
ELECTRICAL CONDENSER
Filed July 21, 1950
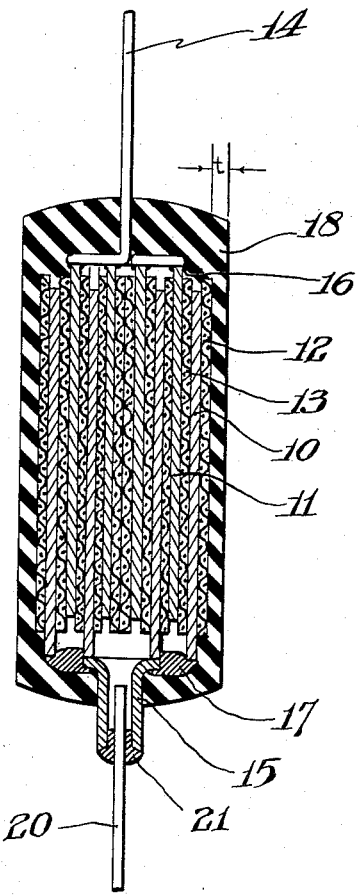
INVENTORS:
PRESTON ROBINSON
HAROLD J. St. DENIS
BY
*Arthur J. Connolly*
their ATTORNEY Patented June 29, 1954

2,682,626

UNITED STATES PATENT OFFICE 2,682,626

ELECTRICAL CONDENSER

Preston Robinson, Williamstown, and Harold J. St. Denis, North Adams, Mass., assignors to Sprague Electric Company, North Adams, Mass., a corporation of Massachusetts Application July 21, 1950, Serial No. 175,222

5 Claims. (Cl. 317—260)

This invention relates to improved electrical condensers and insulation therefor and more particularly relates to improved molded electrical condensers. This application is filed as a continuation-in-part of copending application Serial Number 718,962, filed December 28, 1946, now Patent No. 2,526,688 granted October 24, 1950.

It has long been a practice to attempt to seal electrical apparatus, such as a stacked mica condenser, by inserting it in a mold and then molding a thermosetting resin about it. Such molded articles have been considered resistant to water, oil and common solvents except where leads or terminals penetrate the molding, and these weak spots generally are reinforced by dipping the molded article in a wax or resin varnish.

In molding oil-impregnated condensers with thermosetting resins, such as phenol-formaldehyde, it has been found that the molding pressures are often sufficient to damage the condenser insert. For this reason, molded condensers employ 30% and 50% greater insulation thickness than is required for unmolded condensers of the same material. It has been extremely difficult to mold phenol formaldehyde about a cylindrical oil-impregnated condenser without collapsing or distorting the condenser, causing a dead short or a low voltage breakdown in the product. In addition, the oil squeezes out between the upper and lower molding preforms, leaving a weak joining line.

It is an object of the present invention to overcome the foregoing and related disadvantages. It is a further object to produce outstanding molded electrical condensers. A still further object is to produce a hermetically sealed, durable electrical condenser by inexpensive and simple means. A still further object is to produce heat and pressure molded capacitors possessing properties heretofore practically unattainable. A still further object is to utilize molding compounds and processes heretofore of limited practical value because of the physical properties of the final product. Additional objects will become apparent from a consideration of the following description and claims.

It has been found that the electrical condenser of the present invention may be provided with a molded resin casing without appreciable deformation of the wound condenser section if the dielectric spacer of the condenser is "wet" during the molding operation. The expression "wet" or "moist" refers to a cellulose dielectric spacer material with a minimum moisture content of about 5%, instead of the dried condition of the spacer which is produced by heating at elevated temperatures with or without vacuum. In the case of calendered kraft paper a moisture content of about 5% to about 17% is preferred, whereas in the case of regenerated cellulose, a moisture content of about 7% to about 17% is preferred. The exact figure depends somewhat upon the nature of the fibres and/or the physical form of the spacer. In this "moist" condition, the spacer material is resilient and will not undergo deformation under the molding conditions, in contrast to a dried spacer which almost invariably undergoes deformation under the molding conditions. Oil or wax impregnated paper condenser sections in particular deform and distort badly under the molding conditions. By using the "wet" condenser, it is possible to avoid the necessity of adding extra thicknesses of spacer material between the electrode foils to prevent short circuits or low breakdown voltage values in the molded units.

In order to effect the subsequent rapid impregnation of the condenser with dielectric material, one of the extended electrode foils is provided with an eyelet through which the impregnant may flow and through which the moisture may be removed during the post-molding drying operation. Following impregnation, the eyelet may be sealed by solder. This eyelet serves a multiple function: (a) it acts as a terminal for one of the condenser foils; (b) it forms a passageway facilitating drying and impregnation of condenser section; (c) and it acts as a shield to help prevent penetration of the condenser winding by the molding resin. This particular construction is extremely useful in conjunction with a wound condenser section of the extended foil type.

The types of thermosetting and related resins which may be heat and pressure molded in accordance with the invention are extremely varied. Preferably, the resins are of the phenol-formaldehyde, melamine-formaldehyde and urea-formaldehyde series. However, other resins having similar physical and electrical properties may be employed. For instance, it is possible to utilize the processes disclosed herein on certain of the so-called thermoplastic molding resins, such as the natural and synthetic rubbers, the polyvinyl-aromatic resins, the polyacrylates, the silicones, etc., when proper fillers are employed. When fillers are employed, they may be selected from those of a fibrous nature such as cotton linters, rag stock, asbestos, etc., those of the amorphous type such as the alkaline earths, fuller's earth, etc., those of the cellulose family generally, such as alpha-cellulose, wood flour, etc., and, in some cases, inorganic materials such as ground mica, rutile and the like. We have obtained optimum results utilizing the fibrous fillers mentioned above. The percent by weight of filler, based upon the weight of resin, is ordinarily within the range of 40 to 80. The filler and resin are generally incorporated with one another by customary methods by the manufacturer of the molding powder.

The molding temperatures, times and pressures employed in the process are generally similar to those conveniently employed for the particular resin selected. Pressures are normally from about 100 to about 5000 p. s. i. and the molding temperature normally from about 100° C. to about 210° C. The time of molding will vary from about 10 seconds to about 5 minutes, depending upon the initial state of the molding powder or preform.

It is ordinarily satisfactory to mold inserts in a mold designed to give a relatively thin sectioned molding, usually less than .08" and for best results, less than .06". The thin sectioning of the molding need not be present throughout the unit, but preferably over at least 25% of the surface area of the insert proper, if the insert is a rolled paper condenser, either cylindrical or flat in form. Thus it is possible to use thicker sections in the portions of the molding which require heavier or stronger insulation for electrical or structural reasons.

According to another of the embodiments of the invention, our molded units may be dried under reduced pressures at elevated temperatures to remove moisture and other readily vaporizable materials from both the insert and the molded resin. This drying is preferably under a pressure less than 500 microns of mercury and at temperatures between about 100° C. and about 150° C. The time required for drying will vary with the porosity of the molded resin, the condition of the insert and the size and structure of the eyelet and of the molded unit as a whole. As a general but not invariable, rule, the drying should be conducted for at least 16 hours.

The impregnation process is advisably conducted in the following manner: The molded units, either in the drying chamber or another low pressure chamber, are subjected to a pressure of 1,000 microns of mercury (1 mm.) or less and the dielectric impregnant is introduced into the chamber until it completely covers the molded units. The vacuum may then be broken, preferably with nitrogen, and super-atmospheric pressures produced to hasten impregnation through the eyelet and, in instances where fibrous fillers are employed, through the molded resin. When impregnation is complete, the units may be removed from the chamber and drained to remove external oil or wax. The temperature and the time of impregnation depend upon the nature of the impregnant as well as the size and section thickness of the molded units. As a general rule the temperature is within the range of about 85° C. to about 150° C., and the time is within the range of about 30 minutes to about 24 hours.

The dielectric impregnant employed in accordance with this embodiment may be any of several types conventionally used in electrical condensers and related equipment, as well as others not previously of practical use. The impregnant should be a liquid at the temperature of impregnation and should possess a viscosity not greater than about 200 centipoises at this temperature and preferably not greater than 100 centipoises. While the impregnation may be conducted at any temperature desired, it is generally between 80° C. and 150° C. Various dielectric oils may be used, for example mineral oil, chlorinated diphenyls, vegetable oils such as castor oil, "silicone" oils and various synthetic dielectric oils. These oils are generally impregnated into the molded unit, at temperatures between about 110° C. and about 135° C. It should be noted that dielectric materials which are solid at normal temperatures may be employed, so long as they are liquid at the impregnating temperature. Among these are the various hydrocarbon waxes, generally microcrystalline in structure, the chlorinated naphthalenes, hydrogenated castor oil, and other synthetic waxes. The impregnant should advisably be resistant to moisture.

Another class of impregnants which may be employed in accordance with this embodiment of the invention are the polymerizable vinyl compounds which may be impregnated as monomeric liquids and subsequently polymerized in situ by use of elevated temperatures and/or catalysts. Among these compounds which may be impregnated as monomeric liquids and subsequently polymerized are styrene and substituted styrenes, such as 2,4-dichlorostyrene, p-chlorostyrene, etc.; N-vinyl pyrroles such as N-vinyl carbazole, etc. The allyl ester type monomers are also useful per se or as copolymers with vinyl compounds. In the case of the N-vinyl carbazole, impregnation may be conducted at 85° C. Following impregnation, the units may be held at 120° C. for 24 hours to produce a solid impregnated condenser with high voltage breakdown and long life.

After the impregnation of the condenser section the terminal eyelet is solder sealed, sealing the dielectric within the casing and thus completing the process.

It has been found that molded condensers produced in accordance with the invention are extremely resistant to moisture and to thermal shocks. They may be exposed to high temperature and high humidity for long periods of time without failure. Heretofore, this stability was associated only with metal encased units, particularly those having glass terminal insulators sealed to the container.

Reference is made to the appended drawing which shows a cross-section of an extended foil type electrical condenser produced in accordance with the invention. 10 and 11 represent electrode foils of the condenser unit convolutely wound and separated by dielectric spacing materials 12 and 13. Dielectric spacers 12 and 13 consist of a porous dielectric spacer, such as paper, the pores of which are substantially completely impregnated with a liquid or solid dielectric material, such as mineral oil, chlorinated naphthalene, etc. 14 represents a terminal wire, preferably tinned copper, which is soldered to the extended edges of electrode foil 10 by means of solder 16. 15 represents a terminal eyelet soldered by means of solder 17 to the extended edges of foil 11, some space in the center being left unsoldered to permit impregnation. Terminal wire 20 is solder-sealed to eyelet 15 after impregnation by means of solder 21. 18 represents the molded resin casing.

If the maximum diameter of eyelet 15 is appreciably less than the diameter of the capacitor winding, and this is ordinarily the case, the outer extended edges of foil 10 are usually mashed over and soldered to provide a barrier through which the molding resin, which normally passes through a liquid stage, will not penetrate; thus the capacitor winding is protected from impregnation with molding resin.

As shown in the drawing, the terminal wire 14 and solder 16, which are affixed to the extended edges of foil 11, provide a barrier through which casing resin 18 cannot flow during its liquid stage; thus the central active portion of capacitor winding per se is protected on both ends from impregnation with the resin, which, as a dielectric material, is inferior to mineral oil, and other normal dielectric impregnants.

It should be noted that terminal eyelet 15 is tapered, with the greatest diameter being adjacent to the capacitor winding. This facilitates impregnation of the capacitor section and represents a preferred embodiment of the invention.

It is to be understood that the drawing has been greatly exaggerated for the sake of clarity. It is customary in any type of capacitor winding to provide several outer turns of paper only to protect the unit during processing.

It has been found that the mineral oil impregnated capacitors produced in accordance with the invention differ substantially from previous oil-impregnated paper capacitors, whether housed in metal, cardboard or molded resin containers. In addition to the improvement in breakdown voltage, leakage resistance, etc., the temperature coefficient of capacity of the oil impregnated units of the invention is extremely low, being on the order of about 210 parts per million per degree C. (over a range of 0° C. to 100° C.) as compared to values from about 500 to about 1100 parts per million for prior mineral oil-impregnated paper capacitors of the rolled type. This exceptional capacity stability permits use of the capacitors in many temperature sensitive circuits where heretofore expensive mica or polystyrene capacitors were employed.

The finished capacitors of the invention comprise a cylindrical capacitor section of convolutely wound electrode foils one edge of each of which extends from opposite sides of the winding separated by paper dielectric spacing material, provided with a lead wire soldered to the extended edges of one of said foils and with a hollow eyelet soldered on one end to the extended edges of the other of said foils, encased in a resin casing heat and pressure molded about the section whose paper dielectric contains from about 5% to about 17% moisture and impregnated in a dry state with a dielectric oil, wax or resin, the eyelet being solder sealed to maintain the impregnant within the casing.

Dimension "t" represents the thickness of the section surrounding the cylindrical surface of the condenser and generally should not be greater than .08″ for optimum capacity per gross unit volume.

As an example of the practice of the invention, twenty-four condensers were produced by convolutely winding three layers of .00035″ kraft condenser paper with two aluminum foils to form a cylindrical rolled condenser section. The twenty-four condensers were divided into four lots, referred to below as the A series, B series, C series and D series. The treatment to which the individual series were subjected is described in the following paragraphs.

*A series.*—The sections were conditioned until the moisture content was about 10%, then heat and pressure molded with resin, vacuum dried and impregnated with mineral oil.

*B series.*—The sections were conditioned until the moisture content was about 17%, then heat and pressure molded with resin, vacuum dried and impregnated with mineral oil.

*C series.*—The condenser sections were vacuum dried, mineral oil impregnated, and then heat and pressure molded with a resin casing.

*D series.*—These sections were vacuum dried, then heat and pressure molded with a resin, then re-dried under vacuum and impregnated with a mineral oil. The various processes to which the above condensers were subjected are individually described below:

1. *Molding.*—The resin was a phenol formaldehyde condensation resin which had a wood flour filler. This thermosetting resin was molded for about two minutes at about 310° F. under a pressure of about 500 lbs. per square inch.

2. *Vacuum drying.*—The vacuum drying process involves heating the condensers at a temperature between about 100° C. and 125° C. for 48 hours under a pressure less than 500 microns of mercury.

3. *Impregnation.*—The impregnation consists of subjecting the condenser sections to a pressure less than about 500 microns with a temperature of about 125° C. admitting an electrical grade mineral oil to the chamber until the condenser sections are covered, then breaking the vacuum and allowing atmospheric pressure of air to prevail within the chamber.

The four series of condensers were tested electrically for capacity, power factor, insulation resistance in megohms, and breakdown voltage on direct current.

|  | 60 cycle | | Insulation Resistance in Megohms | Breakdown Voltage, D. C. |
| --- | --- | --- | --- | --- |
|  | Capacity, mfd. | P. F. in Percent | | |
| A-1 | .0182 | .04 | >180,000 | 3,700 |
| A-2 | .0183 | .04 | >180,000 | >4,500 |
| A-3 | .0181 | .04 | >180,000 | >4,500 |
| A-4 | .0194 | .04 | >180,000 | >4,500 |
| A-5 | .0178 | .04 | >180,000 | >4,500 |
| A-6 | .0191 | .04 | >180,000 | >4,500 |
| Ave | .0185 | .04 | [1] 500,000 | >4,350 |
| B-1 | .0179 | .04 | >180,000 | >4,500 |
| B-2 | .0183 | .04 | >180,000 | >4,500 |
| B-3 | .0184 | .04 | >180,000 | >4,500 |
| B-4 | .0178 | .04 | >180,000 | >4,500 |
| B-5 | .0180 | .04 | >180,000 | >4,500 |
| B-6 | .0176 | .04 | >180,000 | >4,500 |
| Ave | .0180 | .04 | [1] 580,000 | >4,500 |
| C-1 | .0182 | .055 | 90,000 | 2,400 |
| C-2 | .0186 | .05 | 98,000 | 2,200 |
| C-3 | .0184 | .05 | 90,000 | 1,200 |
| C-4 | .0192 | .055 | 90,000 | 2,700 |
| C-5 | .0180 | .05 | 90,000 | 2,400 |
| C-6 | .0180 | .055 | 88,000 | 2,200 |
| Ave | .0184 | .052 | 91,000 | 2,180 |
| D-1 | .0192 | .06 | 50,000 | 1,800 |
| D-2 | .0199 | .06 | 33,000 | 3,000 |
| D-3 | .0182 | .06 | 42,000 | 2,300 |
| D-4 | .0204 | .06 | 46,000 | 4,500 |
| D-5 | .0185 | .065 | 40,000 | 1,700 |
| D-6 | .0209 | .06 | 45,000 | 4,300 |
| Ave | .0195 | .061 | 43,000 | 2,950 |

[1] Average was determined by connecting the six condensers in parallel and measuring the insulation resistance and multiplying the reading by six. Conventional instruments for determination of insulation resistance do not read accurately the values exceeding 180,000 megohms.

It will be noted that the insulation resistance of the condensers of the invention, the A and B series, in accordance with the teachings of the application possess insulation resistance values more than 5 times that possessed by the condensers of the C series and more than 10 times that possessed by the D series. The breakdown voltage for the condensers of the A and B series averaged at least twice that of the condensers of the C series and considerably greater and more consistent than those of the D series. The 60 cycle power factor of the A and B series was the lowest of the four series. The capacity was not appreciably varied by the different processes employed.

As many apparently widely different embodiments of this invention may be made without departing from the spirt and scope hereof, it is to be understood that the invention is not limited to the specific embodiments hereof except as defined in the appended claims.

What is claimed is:

1. A rigidly encased electrical condenser which comprises a convolutely wound rolled cylindrical electrical condenser section having electrode members of opposite polarity separated by a dielectric spacer material, a conductive eyelet electrically bonded to the outer portion of the convolutely wound extended edge of one of said electrode members and having a passageway therein exposing the central portion of said wound edge, an electrically conductive terminal lead bonded to the oppositely disposed convolutely wound edge of the other of said electrode members, a thermosetting resin casing enclosing said condenser section as well as a portion of said terminal lead and the outer surface of said eyelet, a dielectric material impregnating said condenser section within said casing, a second terminal lead electrically connected to said eyelet, and sealing means sealing the passageway in said eyelet.

2. The rigidly encased electrical condenser defined in claim 1 wherein the eyelet is metallic and the passageway is tapered so as to provide its largest cross-sectional area adjacent to the edge of the electrode member to which the eyelet is bonded.

3. The rigidly encased electrical condenser defined in claim 2 wherein the tapered eyelet is bonded by solder directly to its electrode member, one of said terminal leads has an end inserted in said eyelet and soldered in place, the other of said terminal leads is bonded by solder to the other of said electrode members, and the eyelet is sealed by means of the soldered terminal lead end.

4. The rigidly encased electrical condenser defined in claim 1 wherein the resin casing is a thermoset phenol-formaldehyde resin.

5. A rigidly encased electrical condenser which comprises a cylindrically rolled electrical condenser section having a convolutely wound set of laterally offset electrode strata of opposite polarity, a conductive metallic eyelet secured and electrically connected to the outer portion of the extended offset edge of one of said electrode strata and having a passageway therein opening into the interior portion of said wound edge, an electrically conductive terminal lead partially inserted in said eyelet and projecting out therefrom, said lead being electrically connected by means of said eyelet, to the offset edge of one electrode stratum, a second terminal lead being connected to the opposite edge of the other electrode stratum, said condenser section, as well as the adjacent portion of said second terminal lead and the outer surface of said eyelet being encased in a rigid thermosetting resin casing, the electrodes being spaced from each other in the winding by an impregnated dielectric spacer, the wound section being impregnated within said casing, and the eyelet passageway being sealed shut.

References Cited in the file of this patent

UNITED STATES PATENTS

| Number | Name | Date |
|---|---|---|
| 1,497,415 | Thomas | June 10, 1924 |
| 2,057,790 | Potter | Oct. 20, 1936 |
| 2,443,826 | Johnson | June 22, 1948 |
| 2,506,446 | Dubilier et al. | May 2, 1950 |